Aug. 15, 1944. E. R. GREER 2,355,912
VEHICLE FOR PROPELLING AND DRIVING ROTARY
SNOW PLOWS AND OTHER MECHANISMS
Filed Feb. 19, 1942. 5 Sheets-Sheet 1
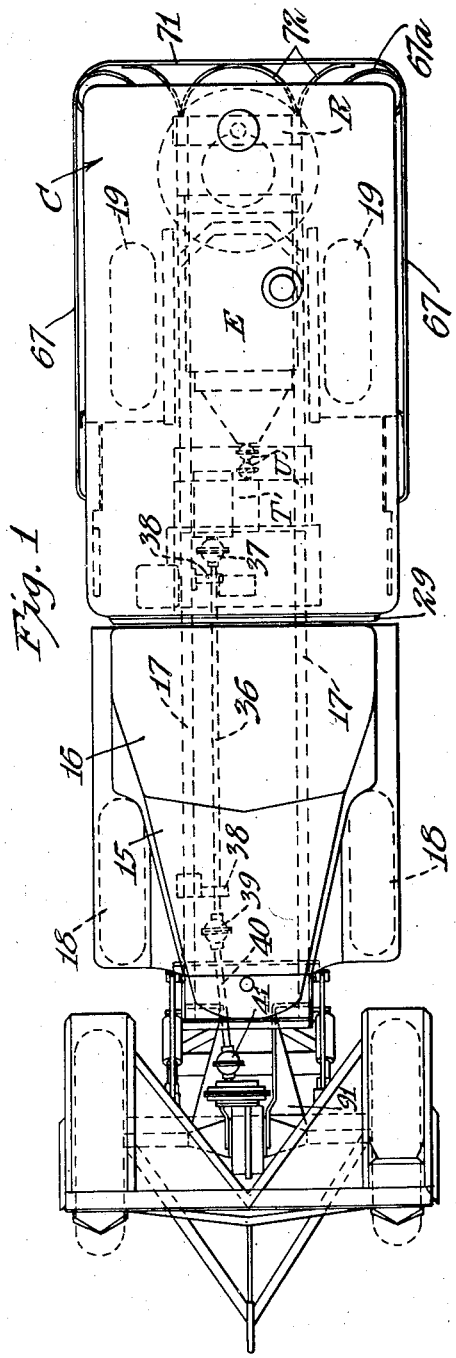
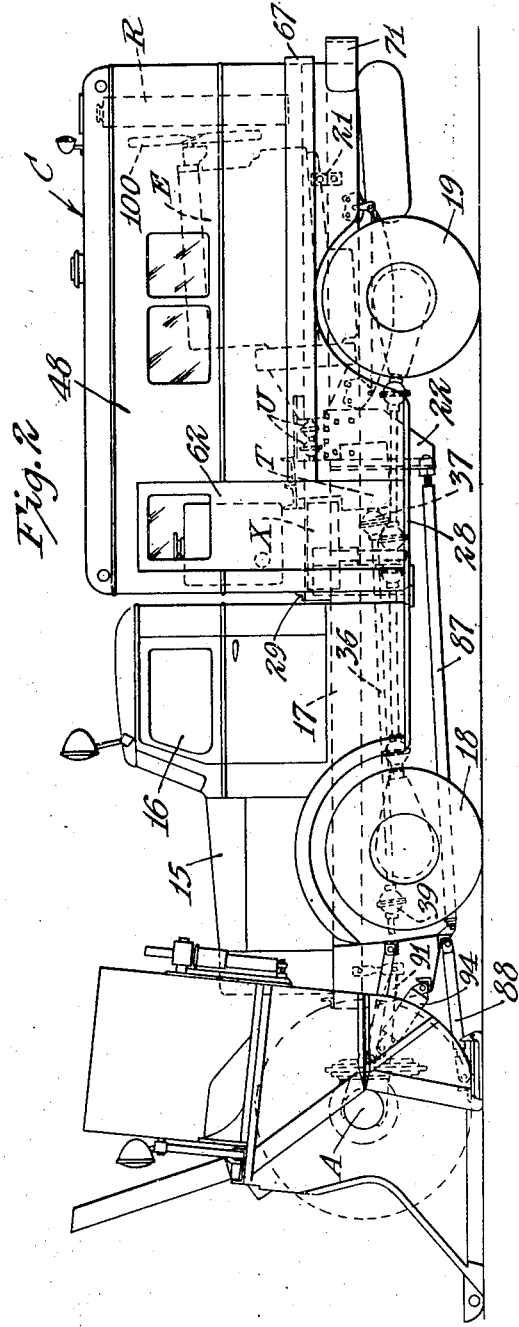
Inventor
Edward Russell Greer
By Williamson & Williamson
Attorneys

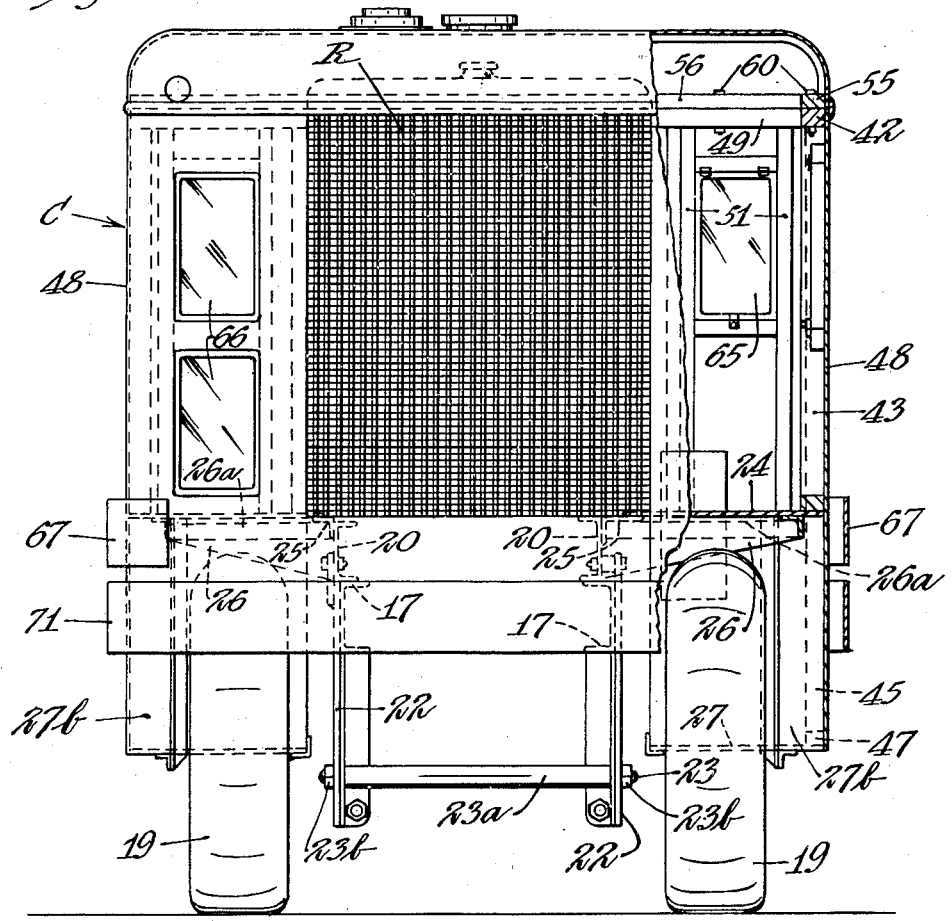
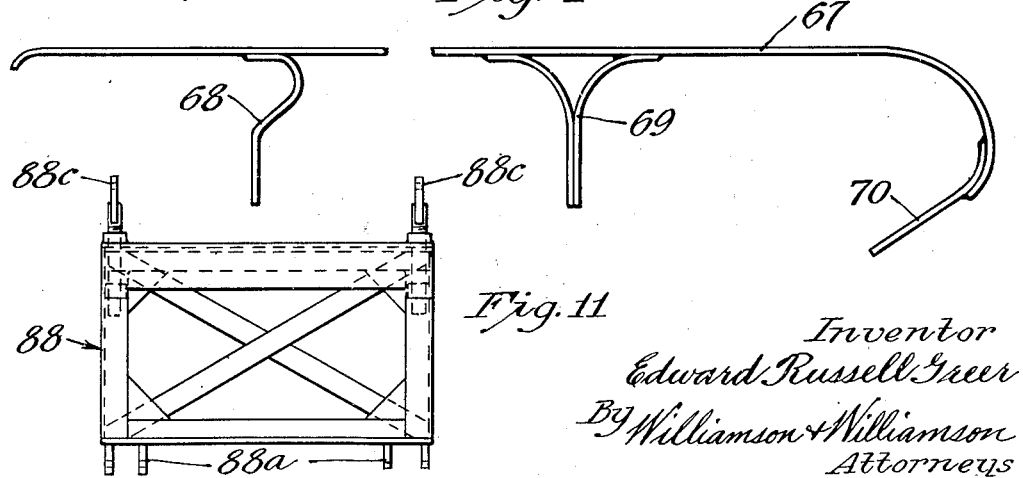

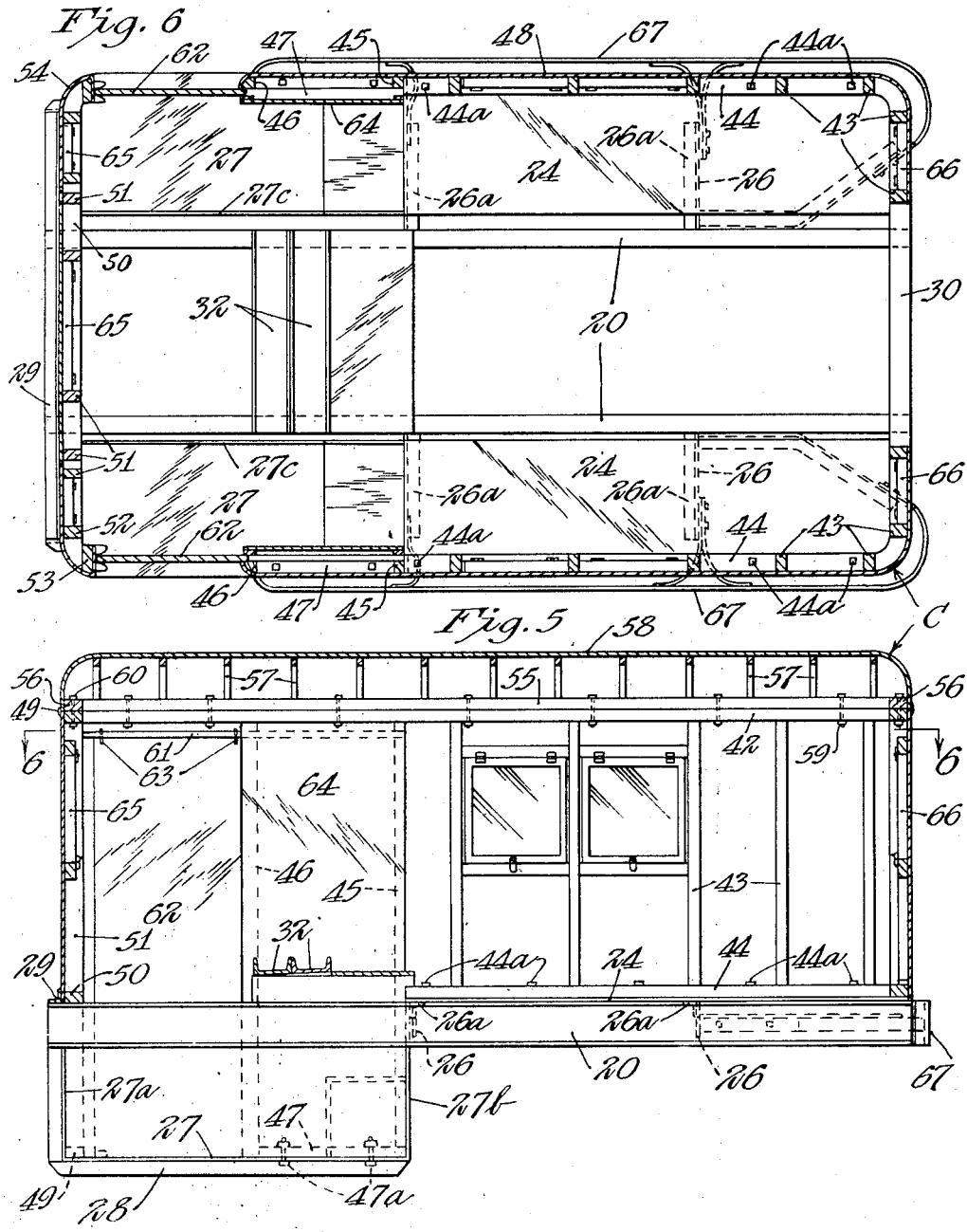

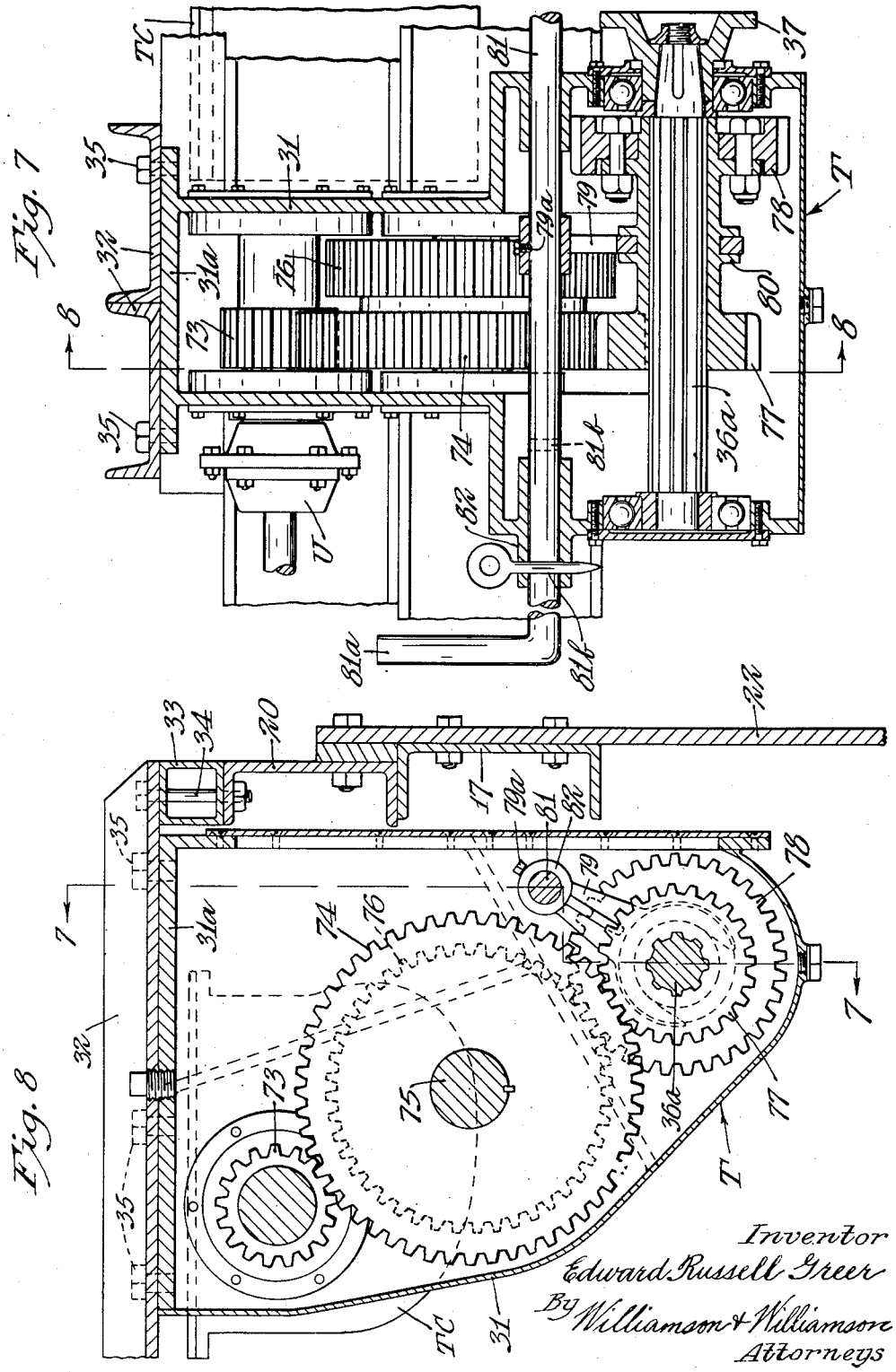

Aug. 15, 1944.　　　E. R. GREER　　　2,355,912
VEHICLE FOR PROPELLING AND DRIVING ROTARY
SNOW PLOWS AND OTHER MECHANISMS
Filed Feb. 19, 1942　　　5 Sheets-Sheet 5

Inventor
Edward Russell Greer
By Williamson & Williamson
Attorneys

Patented Aug. 15, 1944

2,355,912

UNITED STATES PATENT OFFICE 2,355,912

VEHICLE FOR PROPELLING AND DRIVING ROTARY SNOWPLOWS AND OTHER MECHANISMS

Edward Russell Greer, Minnetonka, Minn., assignor to Rotary Snow Plow Company, Minneapolis, Minn., a corporation of Minnesota Application February 19, 1942, Serial No. 431,560

4 Claims. (Cl. 37—43)

This invention relates to vehicles for propelling and driving devices and mechanisms for clearing a path, such as rotary snow plows, brush cutters or dirt moving implements having rotary driven elements comprising working parts thereof.

In rotary snow plows or other power driven mechanisms mounted at the front of a vehicle, adequate power usually supplied by a separate motor carried by the vehicle is required, as are efficient driving connections and transmission mechanism interposed between the propellor shaft of the auxiliary motor and the driven element or elements of the propelled device or mechanism. The problems of power transmission, distribution of weight for proper tractive effort of the vehicle and support of the driven device at the front of the vehicle are complicated by the location of vehicle wheels, frame, and mounting of the vehicle propelling motor and its related driving connections, transmission and differential. Also in vehicles for propelling and driving heavy path-clearing devices such as rotary snow plows, housing space for supplies and quarters for one or more persons in an emergency are desired, occasioning a protective enclosure wherein persons may be seated and wherein working parts, the auxiliary motor and certain controls are readily accessible.

It is an object of my present invention to provide a powerful, heavy duty vehicle for pushing or otherwise propelling and also for driving a device or mechanism mounted on the front of a vehicle such as a large rotary snow plow.

A further object is the provision in a vehicle of the class described, of an auxiliary engine mounted upon the rear portion of the vehicle with driving connections extending to and connected with said propelled device or mechanism and having an associated cabin enclosure cooperatively related with the chassis of said vehicle and with the auxiliary engine and its driving connections and transmission to form a protection for said last mentioned parts and for one or more persons seated therein and constructed compactly for providing the necessary housing space therewithin while being of such dimensions to clear low bridges, and the doorways of garages and other buildings.

It is another object of my invention to provide a vehicle of the class described associated with a plow or analogous propelled device for clearing a path wherein a cabin enclosure is cooperatively associated with the vehicle to protect an auxiliary engine and associated mechanism and to further act as a guide or directing means for facilitating the backing up of the vehicle and device upon the path cleared. In this connection I provide highly efficient horizontal guide runners spaced from, and associated with the side and rear walls of said enclosure.

It is a further object to provide in a vehicle of the class described an efficient mounting for an auxiliary engine and its associated transmission mechanism and driving connections so related that the weaving, twisting or other flexing of the vehicle frame will not fracture or strain any of the driving connections or transmission mechanisms interposed between the auxiliary engine and the propelled device at the front of the vehicle.

A more specific object is the provision in such a vehicle, of transmission mechanism and drive connections so related with the chassis and the auxiliary engine as to transmit power efficiently beneath the propelling motor of the vehicle to the rotary snow plow or analogous propelled device supported at the front of the vehicle and for providing a two speed drive having a means for positively locking the transmission mechanism in either of said two speed positions.

It is a further object to provide a hitch construction or coupling mechanism for connecting a rotary snow plow or other propelled device to the front of the vehicle, with provision for adjustably elevating the propelled device and with provision for supporting and journalling the universal joint driving connections extending to the propelled device and with provision for focusing the shiftable members of the universal joints to maintain a highly efficient working relation of the related parts of said driving connections during all adjusted positions of the propelled device.

These and other objects and advantages will be more apparent from the following description made in connection with the accompanying drawings, wherein like reference characters refer to the same parts throughout the several views, and in which:

Fig. 1 is a top plan view of a propelling and rotor-driving vehicle operatively coupled to a high capacity rotary snow plow and embodying the principles of my invention.

Fig. 2 is a side elevation of the same.

Fig. 3 is a rear elevation with some portions broken away and on a somewhat larger scale.

Fig. 4 is a detail plan view showing the mounting and construction of one of the horizontal side guiding runners detached.

Fig. 5 is a vertical longitudinal section of the cab and enclosure detached from the vehicle chassis.

Fig. 6 is a cross-section of the cab and taken on the line 6—6 of Fig. 5.

Fig. 7 is a longitudinal section of my improved transmission mechanism for the auxiliary engine taken on the line 7—7 of Fig. 8.

Fig. 8 is a cross-section of said transmission mechanism taken on the line 8—8 of Fig. 7

Figure 9:
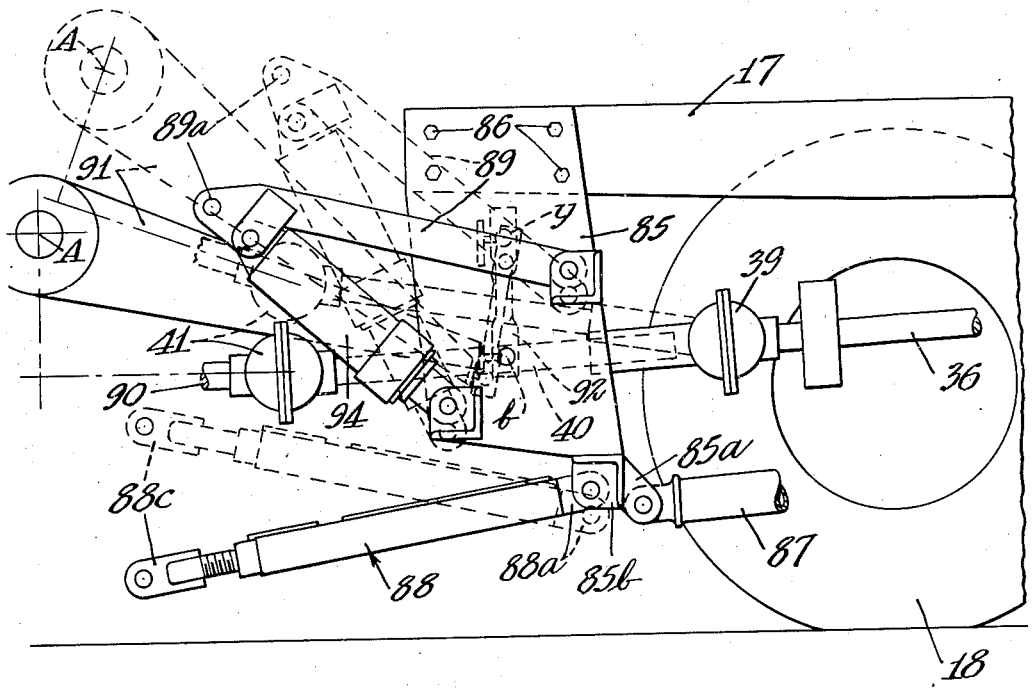

Fig. 9 is a diagrammatical view in side elevation showing the hitch or coupling mechanism with the universal joint-focusing mechanism, the full lines indicating the positions of the cooperating parts when the rotary plow or other propelled device is supported upon the ground, and the dotted lines indicating the related parts in an elevated or adjusted position supported from the front of the vehicle, the resultant dotted line positions of the parts being partially determined by the downward deflection through spring-sag when the weight of the propelled device is supported from the front of the vehicle off the ground.

Figure 10:
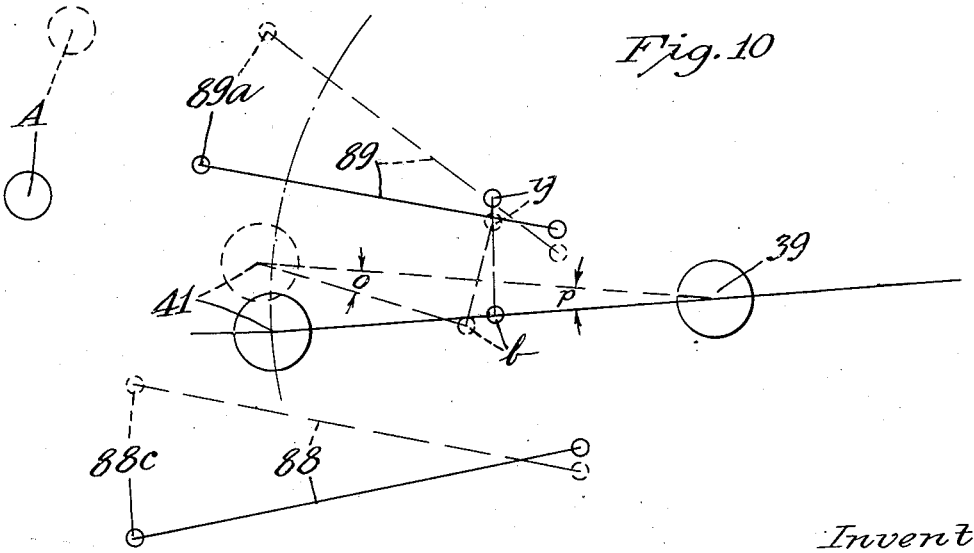

Fig. 10 is a simplified diagrammatic view of the above diagrammatic view Fig. 9 showing merely the center lines, the pivot axes and the equalization of angulation of the tiltable sections of the driving connections due to my improved focusing mechanism when the propelled device is elevated above ground-supporting position, and Fig. 11 is a detail top plan view of my stabilizing push frame for connecting the lower portion of the heavy attachment bracket with the lower portion of the plow or other propelled device.

In the form of my invention illustrated, my improved vehicle and auxiliary driving power mechanism is shown operatively coupled with a high capacity rotary snow plow of the general type disclosed in U. S Letters Patent No. 1,754,322, issued April 15, 1930, and Reissue Letters Patent 19,754, reissued November 12, 1935, both issued to Enterprise Holding Company as assignee of the applicant and inventor John O. Johnson.

The chassis of the propelling vehicle or truck for the most part is of a conventional, four-wheel drive type having the truck propelling motor mounted beneath the hood 15 of the vehicle, having the usual driver's cab 16 mounted directly behind the hood and propelling engine, and having the heavy longitudinal chassis frame beams 17 supported at their forward and rear ends from the front and rear axles respectively of the vehicle through the interposition of conventional front and rear springs. The transmission mechanism, the differential mechanism and the driving connections for driving the front wheels 18 and rear wheels 19 of the vehicle are of conventional construction and will not be described in any detail. The wheels of the vehicle it will be noted are all mounted outwardly of the chassis frame beams 17 and the tires of the rear wheels 19 project somewhat above the level of the top of frame beams 17 in conventional manner.

I provide a sectionally detachable, compact enclosure cabin covering the rear or load carrying portion of the chassis and more particularly covering and enclosing a novel two level cabin floor. A horizontal sub-frame is provided for support of the two level cabin floor and the cabin proper comprising essentially as shown a pair of heavy horizontal channel members 20 mounted upon the chassis frame beams 17 and secured thereto at the inner portions by means of attachment straps or plates 21 bolted or otherwise rigidly secured to the respective channel beams 17 and 20. The forward portions of the subframe channel beams 20 are secured to the chassis frame beams 17 by means of a pair of heavy depending vertical attachment plates 22, suitable securing means including bolts being provided at the upper edge of plates 22 for connection with the subframe beams 20. The depending ends of the heavy plates 22 are secured together in heavily reinforced, spaced relation by a horizontal tie-rod 23 provided with a spacing sleeve 23a and having as shown threaded outer ends which are engaged by clamping nuts 23b for rigidly securing the plates 22 and tie-rod parts. The upper level of the cabin floor comprises a pair of widely spaced horizontal floor sections 24 supported at the sides of the subframe and spaced short distances above the rear vehicle wheels 19. The floor sections 24 as shown are supported along their inner longitudinal edges by horizontal angle bars 25, welded or otherwise rigidly secured to the vertical webs of the subframe beams 20. Hanger brackets 26 reinforced by angle bars are rigidly secured at their inner ends to the subframe beams 20 and extend outwardly and laterally therefrom beneath the floor sections 24.

The lower and forward floor sections 27 are supported from suitable hanger frames 28 rigidly connected at their upper ends to the forward portions of the horizontal subframe beams 20. As shown the lower level floor sections 27 have integrally formed vertical front and rear wall sections 27a and 27b respectively extending upwardly to the level of upper floor sections 24 and the rear wall sections 27b being connected therewith. The floor sections 27 as shown have also integrally formed upwardly extending walls 27c at their inner longitudinal edges, said walls 27c also extending to the level of said upper floor sections 24. With further reference to the hanger frames 28, these are preferably constructed from angle bars bent in U shape or welded together to form U-hangers, the upstanding rear legs of the two hanger frames 28 being end-welded or otherwise rigidly secured to the angle bar stringer 26a which traverses and connects intermediate portions of the longitudinal sub-frame beams 20. The forward upstanding legs of the hanger frames 28 are end-welded or otherwise rigidly secured to the forward transverse angle bar stringer 29 which is superimposed upon and connects the forward ends of the longitudinal sub-frame beams 20.

The sub-frame including the heavy longitudinal beams 20 and the transverse members interconnecting said beams is bodily detachable from the chassis of the motor vehicle and has mounted therein the auxiliary engine E and the transmission mechanism indicated as an entirety by the letter T, in addition to serving as the frame and foundation for the cabin enclosure indicated as an entirety by the letter C. The auxiliary motor E as shown is mounted and supported between the two longitudinal sub-frame beams 20 through preferably a substantially three point suspension attachment means being secured to the fly wheel case and crank case. The engine is mounted substantially horizontally with its crank shaft extending centrally and longitudinally of the vehicle chassis. A radiator R is supported just rearwardly of the engine from the sub-frame and is connected with the circulating cooling system of the engine, said radiator being boxed in a frame 30 and forming with said frame a partial closure for the rear of the cab.

Suspended forwardly of the auxiliary engine E is the transmission mechanism T shown in detail in Figure 7 and encased in a transmission casing 31 of an irregular U-shaped cross section. Transmission mechanism T, it will be noted, is positioned just rearwardly of the truck transmission case X with its depending lower portion extended downwardly some distance below the bottom of case X for adequate clearance of the driven shaft some distance below case X. Transmission mechanism T is suspended in such manner that the mechanism thereof will not be affected or subjected to strain through the weaving and twisting of the frame members of the vehicle chassis. To this end I provide transverse suspension means as shown in the form of a pair of channel members 32, the ends of which overlie and are supported upon hollow filler members 33 which in turn rest upon the upper horizontal webs of the longitudinal sub-frame 20, nutted bolts 34 being utilized to secure said channel members, fillers and sub-frame beams. A transmission case 31 is suspended by connection of its heavy top plate 31a to the transverse channel members 32 as shown having attachment bolts 35 being utilized. The transmission case 31 as shown is mounted at one side of the longitudinal center line of the vehicle to provide for working clearance of the driven shaft, universal joints etc. from the truck transmission case and the driving connections of the truck motor.

The driving connections between the auxiliary engine E and transmission mechanism C include a double universal joint U as shown in Figures 1 and 2. The driven shaft 36 includes just forwardly of the transmission mechanism a universal joint 37 and extends forwardly and slightly downwardly below the chassis frame of the vehicle, the forward portion of driving shaft 37 being journalled as shown in a self aligning bearing 38 mounted on the vehicle chassis. The forward end of driven shaft 36 is connected by the universal joint 39 with a telescoping universal joint, drive shaft 40 to be later described in detail which drive shaft is connected at its outer end through the universal joint 41 with the transmission mechanism for driving the rotary element or elements of the propelled device (in the form disclosed the rotors of the rotary snow plow coupled to the front of the vehicle).

The cabin enclosure as shown comprises a pair of readily detachable side sections each extending from the rear edge of the doorway around the rear end of the cabin and at the rear to the respective side edges of the boxing or radiator frame 30. Each of the side sections as shown comprises a frame made up of a longitudinal top member or sill 42 connected by vertical studding members 43 with a lower longitudinal frame member or bar 44 which extends over and is removably secured by bolts 44a to one of the upper level floor sections 24. Elongated vertical studding members 45 and 46 connect the upper longitudinal member 42 of the side section with a short horizontal frame member 47 which is in turn removably bolted to the lower level floor section 27 by nutted bolts 47a. Each side section as has been stated extends around the rear corner of the enclosure, its inner edge abutting against the radiator boxing of frame 30. Additional studding members 43 connect rear sills or portions of the longitudinal upper and lower frame members. The side section frames constructed as described are covered on their exterior by walls 48 of sheet metal or other suitable material.

The front wall of the cabin enclosure as shown is detachable from the sub-frame and comprises a frame made up of horizontal upper and lower sill members 49 and 50 interconnected by a series of spaced vertical studding members 51. Additional vertical studding members 52 disposed outwardly of the first mentioned studding members 51 extend below the sill 50 to the forward and lower floor sections 27 and are suitably secured to said floor sections. Similar studding members 53 provide the rear edges of the frame for the front section and are disposed somewhat rearwardly and outwardly of the studding members 52 and also extend downwardly to the floor sections 27 and are secured thereto at their lower ends. The wall 54 for the front cabin section is constructed of suitable sheet material, covering and attached to the front section frame constructed as described.

My cabin enclosure is provided with a removable roof comprising a rectangular frame made up of longitudinal horizontal members 55 connected at their ends by transverse frame members 56, the frames so constructed having attached thereto in bridging relationship a plurality of bent roof supporting ribs 57. The roof proper 58 constructed of suitable sheet material covers said ribs and is attached thereto and to the outer edges of the frame comprising members 55 and 56. The frame members 55 and 56 of the roof rest upon and are secured to the upper sill members 42 of the frames of the side sections by suitable attachment means such as nutted bolts 59. The forward ends of the longitudinal roof frame members 55 are secured by bolts 60 to the upper sills 49 of the front section frame thereby also securing the front end of the side section frames to the front section. Thus the sills of the roof comprising frame members 55 and 56 form a complete rectangle tying the sides and end together into a strong unitary structure.

The walls 48 of the side cabin sections it will be noted terminate some distance short of the front section at their forward edges providing a doorway at each side of the cabin, above the forward and lower floor sections 27. Horizontal door supporting rails 61 are supported from the underside of the side frame members 42 at the top of the doorway upon which are slidably hung the vertical doors 62, hanger straps 63 being utilized to make such sliding attachments. The doors 62 as clearly shown in Fig. 6 slide horizontally and backwardly into a housing formed by the wall and frame members of the corresponding side section and by a vertical panel 64 secured to and supported from the sills or upper and lower side frame members 42 and 44 respectively, said panels being spaced the appropriate distance from the vertical studding members 45 and 46 to properly receive the door and suitable cushioning means being provided in the door frame and abutment at the rear end of the door housing. The housing formed by the inclusion of panels 64 prevents any object housed within the cabin from interferring with the operation of the doors in use.

In the front section of the cabin I provide transparent windows 65 as shown, three in number, with a larger window disposed centrally and substantially in alignment with the rear window of the truck cab and mounted for opening for communication purposes. The two narrower windows in the side portions of the front cabin section are aligned longitudinally of the vehicle with two pairs of rear windows 66 formed in the rear portions of the side sections at either side of the radiator boxing. The windows 65 and 66 are so arranged and related that the vehicle driver or an attendant in the truck cab can look rearwardly through the truck cab window and windows of my cabin enclosure and see a vehicle, person or other objects approaching from the rear of the cab.

It will be noted that the ploughing or overall clearing width of the rotary snow plow coupled to the front of the vehicle is somewhat greater than the width of my cabin enclosure C. The rear rounded corners of the cabin and the upstanding side walls therefore may act as guiding surfaces for snowbanks, brush or other obstructions to guide the vehicle in rearward travel through the path formed by the plow or other device. To facilitate such rearward guiding action I provide at each side of the cabin enclosure and spaced a few inches outwardly thereof, a horizontal guide runner 67 extending as shown from the rear edge of the doorway rearwardly to the end of the cabin and around the adjacent rear corner thereof terminating in an inwardly curved and somewhat resilient rear extremity 67a. These guiding runners 67 as shown are secured to the sub-frame through forward, intermediate and rear brackets 68, 69 and 70 respectively, said brackets being removably attached to appropriate portions of the sub-frame such as the angles or gussets supporting the upper floor sections. A rear bumper and auxiliary guiding member 71 is suitably attached by brackets 72 to either the sub-frame or vehicle frame, and is arranged and related with the guide runners 67 and the rear corners thereof to supplement at the corners of the cabin, the side runners in their guiding functions during the rearward travel of the vehicle through the path cleared.

Referring now in detail to the transmission mechanism for the auxiliary engine (see Figs. 7 and 8) it will be noted that the forward end of the auxiliary engine crank shaft, terminating in the double universal joint U the forward joint of which is shown in Fig. 7, connects with and drives a pinion 73 suitably journaled in the transmission case 31 and in constant mesh with a relatively large intermediate gear 74 disposed therebelow. Intermediate gear 74 has fixed thereto and mounted on a common sub-shaft 75, a smaller intermediate gear 76. The inner end 36a of the driven shaft 36 is journaled as shown in suitable ball bearings mounted in the transmission case 31 and has splined thereon the sliding high speed gear 77 and the sliding low speed gear 78 said gears being integrally formed or fixed together for sliding in unison upon the inner end 36a of the driven shaft. A shifting fork 79 engages a shipper collar 80 formed intermediately of said sliding gear 77 and 78 and is affixed at its upper end by sleeve and set screw attachment 79a to a horizontal shift rod 81 slidably journaled in bearings provided by the transmission case and terminating at its rearward end in an angled handle 81a. The rearwardly disposed slide bearing 82 for the shift rod is provided with a boss having a diametrically disposed bore formed therethrough adapted to receive a bayonet shaped locking pin 83. Locking pin 83 is of course detachable and is adapted to also pass through one or the other of a pair of spaced diametric locking apertures 81b formed in a rearward portion of the slip rod at proper points to lock selectively the sliding gears 77 and 78 in mesh with their respective cooperating intermediate gears 74 and 76 respectively. The universal joint 37, a portion of which is shown in Fig. 7, connects the rearward or transmission end 36a of the driven shaft with the main portion 36 of said driven shaft as has been described earlier in this specification. The construction of my improved transmission mechanism as illustrated and described, minimizes the fore and aft length of the overall thickness of the transmission mechanism adjacent the upper portion thereof and thus accommodates and makes clearance for the transmission case TC of the vehicle propelling motor as shown in dotted lines in Fig. 7. The construction and relation of the gear train of my improved transmission mechanism further makes provision for accommodation of the driven shaft for operating the rotary snow plow or other propelled device without interference from the vehicle drive parts, differentials, front axle, transmission, braking drums, etc. There is, of course, no possibility of the gears of my transmission mechanism disengaging during operation of the propelled device at either high or low speeds due to the positive locking means provided.

I provide a highly efficient coupling and universal joint focusing mechanism for connecting the rotary snow plow or other propelled and driven device with the forward end of the propelling vehicle. With propelled devices for clearing a path, moving material or analogous devices, which require adjustment in elevation as well as during driving operations, the problem of maintaining an efficient working relation of the several parts of the driving connections in all adjusted positions is difficult. More specifically the equalization of the angularity of the universal joint on the driven shaft and the universal joint on the driven device must be maintained to secure desired results. In accomplishing such equalization it is highly important during the extreme adjusted positions of the propelled device to keep the distances between the universal joint centers as closely constant as possible.

My improved coupling and universal joint focusing structure disclosed in Figs. 1, 2, 9 and 10 accomplish the results desired. I provide a pair of heavy coupling brackets 85 disposed substantially vertically in widely spaced relation and rigidly secured to the longitudinal frame beams of the vehicle's chassis at the front ends thereof forwardly of the front wheels. As shown brackets 85 are rigidly secured to chassis beams 17 by a plurality of heavy bolts 86 and depend therefrom extending to points some distance above the ground line and terminating in downwardly and rearwardly extended attachment lugs 85a to which are secured the forward ends of elongated push poles 87 the rear ends of which as shown as in Fig. 2 are secured to the heavy depending brackets 22 which originally connected with the chassis frame and also the longitudinal beams 20 of the sub-frame. A rectangular push frame designated as an entirety by the numeral 88 as shown in Figs. 11 and 9 is provided with rearwardly extending heavy attachment lugs 88a at the side portions thereof for pin connections with mating lugs 85b of the coupling brackets 85. At the forward end of the push frame 88 is a pair of threadedly adjustable connecting lugs 88c which are provided for pivotal connection with the lower portion of the main frame of the rotary snow plow or other driven and propelled device. The position or extension of the lugs 88c may be adjusted by twisting the lug carrying the threaded shank to obtain the desired adjustment. A pair of heavy, upper radius links 89 are pivoted at their rear ends respectively to the coupling brackets 85 and have their forward ends pivotally connected by pins 89a with suitable pivot lugs provided on the upper portion of the main frame of the propelled device. The transmission housing of the propelled device such as the rotary snow plow is cradled for oscillation on a transverse horizontal axis A. In the case of the rotary snow plow herein indicated the axes of the driven rotors lie on this same common axis.

The driving of the rotors or other driven elements on the propelled device such as the rotary snow plow as has been previously recited, is accomplished through the driven shaft 36 the forward end of which is shown in Fig. 9, and its universal connections through the universal joint 39, the short telescoping shaft 40 and the second universal joint 41, one part of said joint being secured to the shaft 90 which is drivably connected with and bears a fixed relation to the driving transmission mechanism of the rotary plow or other propelled device. The axis of bodily oscillation therefore of the transmission mechanism of the rotary snow plow and also for swinging of shaft 90 is the common axis A for oscillation of the rotors of the propelled device. A rearwardly extending torque arm 91 is fixed to the axial transmission housing for the rotors of the propelled device and extends rearwardly terminating in a pivotal connection such as ball b located approximately on the center line of the extension of the driven shaft 36 and located midway between the centers of universal joints 39 and 41. Ball b is swivelly connected with the lower end of a torque link 92, the upper end of which is swivelly connected with a ball y, said ball being fixed to an extension or lug rigidly secured to one of the vertical coupling brackets 85. The swinging of link 92 of course determines the position of the ball b for any adjustment of the propelled device, which in turn determines the position of the torque arm and consequently the shaft 90 which has a fixed axial relationship to the transmission housing for the rotors of the propelled device.

Hydraulic rams 94 of a conventional type are illustrated as interposed between and pivotally connecting suitable attachment lugs on the bracket 85 and attachment lugs adjacent to the forward end of the radius links 89. The hydraulic connections to the rams are not shown and the ram is merely illustrative of a means for power-lifting the propelled device. Referring to Figs. 1, 9, and 10, the object of the described mechanism is to move the universal joint 41 to a position wherein the center distance between the universal joints, 39 and 41 will remain practically constant and avoid the excessive slip action of the telescoping shaft 40 and to also maintain the angles of the joints 39 and 41 practically equal to each other. In the functioning of my device such is accomplished. The lifting action of the ram moves the pivotal connection of 89a of radius link 89 through an arc to the point shown in dotted lines in Figs. 9 and 10. By the same lifting action, the pivot pin of the lug 88c moves from the full line position in an arc to the dotted line position shown in Figs. 9 and 10. In such elevation of the propelled and driven device, the weight thereof is lifted from the ground and imposed upon the chassis frame at the forward end of the vehicle. Deflection of the chassis frame due to spring sag, positions the pivoted rear ends of the radius links 89 and attachment lugs 88a of the push frame in the dotted line positions indicated in Figs. 9 and 10. The torque link 92 swings forwardly a short distance at its lower end directing the torque arm 91 which of course in turn directs and determines the adjusted position of the shaft 90 and the universal joint 41 connected with the rearward end of such shaft. The telescoping shaft 40 takes up the intermediate position between the two universal joints 39 and 41 with the result that the angles indicated as O and P in Figure 10 are always maintained in approximate equality. This equalization of joint angles assures uniform rotary movement and avoids vibration in all adjusted positions of the propelled and driven device.

From the foregoing description it will be seen that I have provided a complete vehicle for propelling and efficiently driving an auxiliary device such as a rotary snow plow or other path-clearing or material moving apparatus with provision for adjusting the propelled device in elevation during driving operations thereof, and with provision for housing and protecting the auxiliary engine and transmission associated therewith. The combination vehicle and path-clearing device propelled thereby provides in the structure of my cabin enclosure and associated guiding runners a means for guiding the entire assembly away from obstructions and banks during rearward travel.

The construction of my enclosure cabin enables the roof or side sections or both to be readily lifted off of and detached from the said frame to facilitate removal and repair of the auxiliary engine, transmission mechanism, and associated parts. The construction of the cabin further through utilization of space and the arrangement of floor levels, supports and doors to efficient advantage, is very compact and of minimum height and may pass through conventional doorways of garages and other buildings without obstruction while nevertheless affording accommodations and accessible entrance for persons picked up on the road in an emergency.

Another important feature of the combination of my cab construction with the radiator R and the fan identified by the number 100 of the auxiliary motor is as follows:

Fan 100 is a suction fan drawing air from the outside of the rear of the cabin through the radiator and thereby warming such air, such air being circulated forwardly and building up some small amount of air pressure within the interior of the cabin. Thus through such air pressure and discharge of air from leakage spaces, the interior of the cab is kept warm and dry, and snow, dust and other material from the road is prevented from entering the cab and collecting upon the working parts enclosed therein.

It will of course be understood that various changes in the form detail and arrangement of parts may be made all within the scope of my invention.

What is claimed is:

1. In a motor vehicle for propelling and driving a device, such as a rotary snow plow, a bodily removable auxiliary unit comprising a sub-frame superimposed upon the frame of said chassis and detachably secured thereto, an auxiliary engine mounted substantially horizontally in said subframe and extending longitudinally and centrally of said chassis, a transmission mechanism mounted on said sub-frame and connected for driving with said auxiliary engine said transmission mechanism having a power take-off extending forwardly below all of the associated parts of the vehicle propelling motor and off set some distance from the longitudinal center line of said chassis, a cabin enclosure mounted upon said sub-frame and housing said auxiliary engine and said transmission mechanism, said enclosure having a readily removable roof and a pair of upstanding removable sides, and a floor supported from said sub-frame, said floor comprising an upper and rearward section disposed above the top of the rear wheels of said vehicle, and comprising a lower and forward entrance section disposed a short distance above the ground line and medially between the front and rear wheels of said vehicle and a sliding door associated with said entrance floor section, one of the upstanding sides of said cabin and said entrance floor section providing a full height doorway into said cabin, and means disposed inwardly of said door for shielding the same from interference in operation due to articles within said enclosure.

2. In combination with a motor vehicle having a chassis of the truck type and in combination with a propelled path-clearing device coupled to the forward end of said vehicle and having rotary driven parts, an auxiliary engine supported from the rear portion of said chassis and extending longitudinally of said vehicle, a transmission mechanism supported from said chassis forwardly of said auxiliary engine, driving connections between said transmission mechanism and said propelled device, and a cabin enclosure mounted on said chassis and covering said auxiliary engine and said transmission mechanism, said enclosure being of a width less than the over-all path-clearing width of said propelled device, and said enclosure having upstanding longitudinally extending guiding surfaces and rear inwardly curved guiding surfaces merging therewith, said guiding surfaces guiding said vehicle in rearward travel through the path formed by said propelled device.

3. In combination with a motor vehicle having a chassis of the truck type and in combination with a propelled path-clearing device coupled to the forward end of said vehicle and having rotary driven parts, an auxiliary engine supported from the rear portion of said chassis and extending longitudinally of said vehicle, a transmission mechanism supported from said chassis forwardly of said auxiliary engine, driving connections between said transmission mechanism and said propelled device, and a pair of widely spaced, longitudinally extending guiding runners mounted along the sides of the rear portion of said chassis and spaced outwardly from said auxiliary engine and said transmission mechanism and extending somewhat beyond the rear end of said chassis and having inwardly curved rear portions, said runners being spaced apart a distance of less width than the over-all, path-clearing width of said propelled device and being adapted to guide said vehicle in rearward travel through the path formed by said propelled device.

4. In a motor vehicle for propelling and driving a rotary device, such as a rotary snow plow, an auxiliary removable unit comprising a sub-frame superimposed upon the frame of said chassis, an auxiliary engine mounted substantially horizontally in said sub-frame and extending longitudinally of said vehicle substantially in alignment with the longitudinal center line of said chassis, a transmission mechanism mounted on said sub-frame and connected for driving with said auxiliary engine, said transmission mechanism having a forwardly extending power take-off, off set laterally some distance from the longitudinal center line of said chassis and below the propelling motor, transmission mechanism and other related motor parts, a cabin enclosure mounted upon said sub-frame and housing said auxiliary engine and said transmission mechanism, said enclosure having a readily removable roof and a pair of upstanding removable sides, and a floor supported from said sub-frame, said floor comprising an upper and rearward section disposed above the top of the rear wheels of said vehicle and comprising a lower and forward entrance section disposed a short distance above the ground line and medially between the front and rear wheels of said vehicle and a door associated with said entrance floor section, one of the upstanding sides of said cabin and said entrance floor section providing a full height doorway into said cabin.

EDWARD RUSSELL GREER.